United States Patent [19]
Niki et al.

[11] Patent Number: 5,633,959
[45] Date of Patent: May 27, 1997

[54] POLARIZATION STATE CHANGING APPARATUS AND POLARIZATION DEGREE MEASURING APPARATUS USING THE SAME

[75] Inventors: Shoji Niki, Saitama; Eiji Kimura, Gyoda, both of Japan

[73] Assignee: Advantest Corporation, Tokyo, Japan

[21] Appl. No.: 540,052

[22] Filed: Oct. 6, 1995

[30] Foreign Application Priority Data

Oct. 11, 1994 [JP] Japan ................... 6-245371
May 9, 1995 [JP] Japan ................... 7-110521

[51] Int. Cl.$^6$ ................... G02B 6/00
[52] U.S. Cl. ................... 385/11
[58] Field of Search ................... 385/1, 2, 11, 8, 385/39, 40, 50; 359/156, 161, 483, 484, 489, 494, 497

[56] References Cited

U.S. PATENT DOCUMENTS

| | | | |
|---|---|---|---|
| 4,529,262 | 7/1985 | Ashkin et al. | 385/50 X |
| 4,615,582 | 10/1986 | Lefevre et al. | 385/4 |
| 5,004,312 | 4/1991 | Shimizu | 385/1 |
| 5,471,545 | 11/1995 | Negami et al. | 385/1 |

*Primary Examiner*—Akm E. Ullah
*Attorney, Agent, or Firm*—Staas & Halsey

[57] ABSTRACT

A polarization state changing apparatus which can change the polarization state of an incident polarized light entering to an optical fiber to any direction and can output is provided. This polarization state changing apparatus, in an embodiment, comprises three polarization plane maintaining optical fibers 10, 20 and 300 which are serially connected at two polarization plane changing parts 30 and 30'. Those three polarization plane maintaining optical fibers are connected at the polarization plane changing parts 30 and 30' so that the optical axes X and Y of the adjacent optical fibers are mutually rotated at an angle of 45 degrees in terms of the fiber axis. Stress application parts for applying stress to each of the polarization plane maintaining optical fibers are provided. In a specific example, each optical fiber is wound around each piezoelectric element cylinder and predetermined stress is applied to each optical fiber by driving those piezoelectric element cylinders by power supplies each of which oscillating frequency and generated voltage are both variable. Also, a polarization degree measuring apparatus using the polarization state changing apparatus is provided to measure degree of polarization accurately and quickly.

13 Claims, 17 Drawing Sheets

$\delta = 0, 2\pi$ $\delta = \dfrac{\pi}{4}$ $\delta = \dfrac{\pi}{2}$ $\delta = \dfrac{3}{4}\pi$ $\delta = \pi$ $\delta = \dfrac{5}{4}\pi$ $\delta = \dfrac{3}{2}\pi$ $\delta = \dfrac{7}{4}\pi$

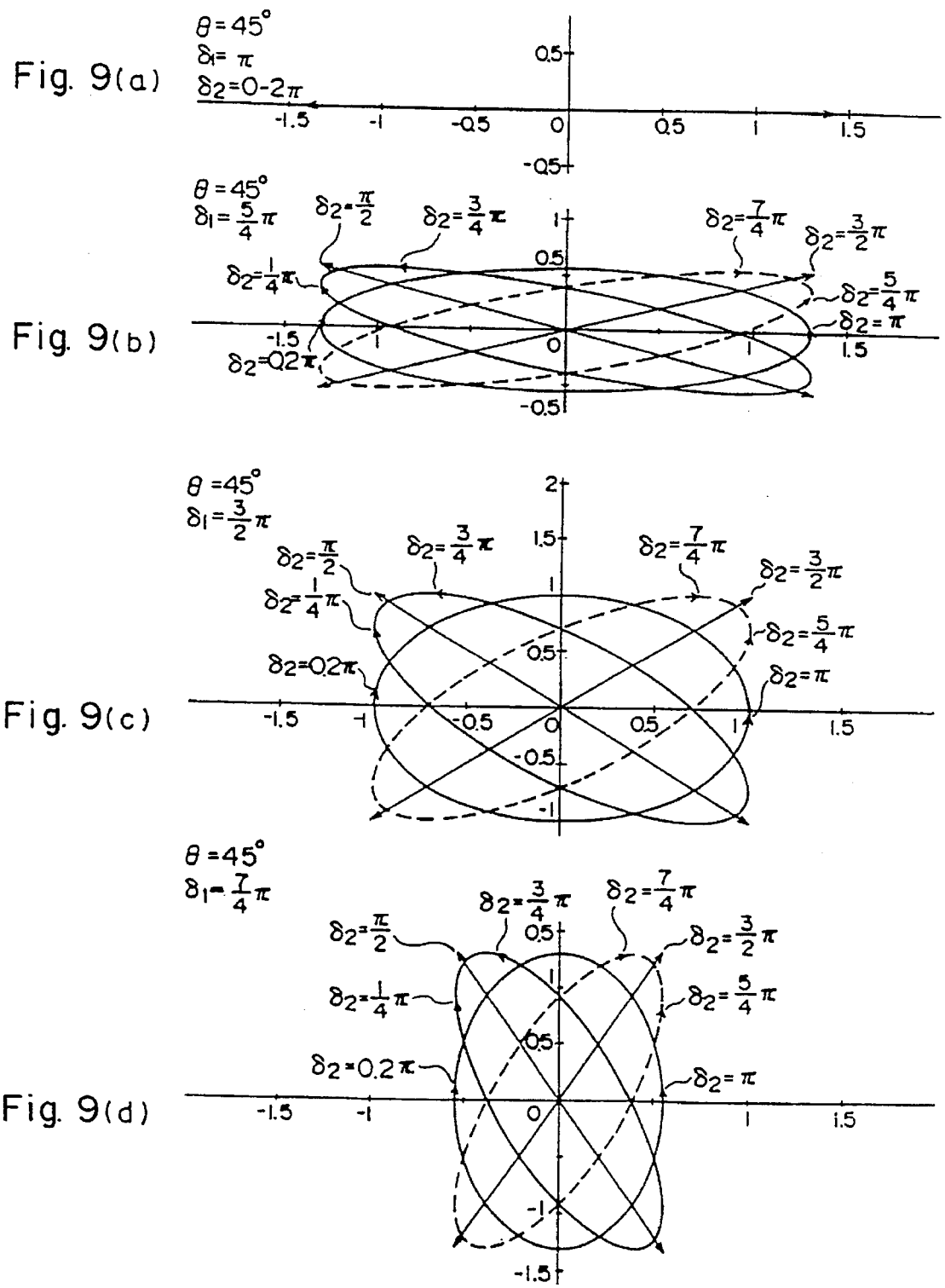

POLARIZATION STATE CHANGING APPARATUS AND POLARIZATION DEGREE MEASURING APPARATUS USING THE SAME

TECHNICAL FIELD

The present invention relates to a polarization state changing apparatus which can change a polarization state (polarization direction) of a polarized light and to a polarization degree measuring apparatus using the polarization state changing apparatus, and more particularly to a polarization state changing apparatus that can change a polarization state of an incident polarized light to a polarization state of arbitrary direction to output the polarized light and to a polarization degree measuring apparatus which utilizes the polarization changing apparatus.

PRIOR ART

A polarization state changing apparatus is used to measure the porarization characteristics (polarization dependency) of various optical parts such as a optical coupler, a photo-filter, a photo-diode etc. It is necessary to randomly change a polarization state of a polarized light which enters those optical parts in order to measure the characteristics of a polarized light. Therefore, it is requested for a polarization changing apparatus to output a generate and output a polarization light having a polarization state of any direction, and also to provide a stable output light.

A polarization state of a polarized light can be changed by arranging a λ/2 wave plate (a birefringent plate which provides λ/2 light path difference between polarized lights mutually oscillating in perpendicular directions when they pass through the plate) and a λ/4 wave plate (a birefringent plate which provides λ/4 light path difference between polarized lights mutually oscillating in perpendicular directions when they pass through the plate) in series and by giving an optical phase difference to a polarized light passing through those wave plates.

FIG. 1 shows an example of a conventional polarization changing apparatus that utilizes wave plates. This polarization changing apparatus comprises a λ/2 wave plate 1 and a λ/4 wave plate 2 which are made of crystalline plate (bulk element) and those wave plates are arranged so that they can be rotatable by a rotation feature (not shown). A polarized light enters the λ/2 wave plate 1 first and λ/2 optical phase difference is generated when propagating through the λ/2 wave plate 1. The polarized light with this phase difference then enters the λ/4 wave plate 2 and λ/4 optical phase difference is further generated when propagating through the λ/4 wave plate 2. Thus, phase differences of λ/4, λ/2, 3 λ/4, λ, . . . can be generated for the polarization state of a polarized light outputted from the λ/4 wave plate by combining those two wave plates and the polarization state of an incident polarized light can be changed.

FIG. 2 shows another example of a polarization state changing apparatus that utilizes wave plates. This polarization state changing apparatus comprises a λ/2 wave plate 3 and a λ/4 wave plate 4 each of which is constructed by winding an optical fiber 2–3 turns in loop, and those wave plates 3 and 4 of optical fibers are arranged so that they can be rotatable by a rotation feature (not shown). A polarized light enters the λ/2 wave plate 3 first and λ/2 optical phase difference is generated when propagating through the λ/2 wave plate 3. Then, the polarized light enters the λ/4 wave plate 4 and λ/4 optical phase difference is further generated when propagating through the λ/4 wave plate 4. Thus, phase differences of λ/4, λ/2, 3 λ/4, λ, . . . can be generated for the polarization state of a polarized light outputted from the λ/4 wave plate by the combination of the two wave plates of optical fiber loops and the polarization state of an incident polarized light can be changed.

However, since the aforementioned conventional polarization state changing apparatus is arranged such that the polarization state of an incident polarized light is changed and outputted by rotating those λ/2 wave plate and λ/4 wave plate, some means for rotating those wave plates is required. In addition, in order to create a linear polarization, an elliptic polarization and a circular polarization for changing the direction of the polarization to any direction of 360 degrees, an independent rotation of each wave plate is necessary to implement combinations of every rotation angle. Furthermore, making combinations of all rotation angles takes long time.

In the apparatus of FIG. 1, since the axis displacement between the λ/2 wave plate and the λ/4 wave plate occurs, the axis displacement must be adjusted. Also, there is a shortcoming that the reflection loss of the incident light at the wave plate surface is remarkable, and the reflection loss badly influences the measurement result.

In the apparatus of FIG. 2, since an optical fiber is formed in loop and the looped optical fiber must be equipped to be rotatable, there is a disadvantage that the formation of the wave plates is complex.

Incidentally, in a patent application No. Sho 58-116342 (patent publication No. Hei 4-52443) filed on Jun. 28, 1983, an optical fiber type polarization compensation apparatus comprising means for changing a phase difference between two mutually orthogonal polarized light components of a propagating light by applying external stress to an optical fiber, means for detecting polarization state of an outputted light from the optical fiber and a feed back control scheme for applying appropriate external stress to the optical fiber in response to a detected polarized state is disclosed. In this optical fiber type polarization compensation apparatus, the polarization state of an outputted light from a polarization maintaining optical fiber 15 of previous stage is maintained in either of elliptic polarization of phase difference π/2, linear polarization of fiber main axis direction or linear polarization of perpendicular direction to the fiber main axis. The polarization state of an outputted light from a polarization maintaining fiber 16 of post stage is maintained in linear polarization inclined at an angle of 45 degrees to the fiber main axis. Therefore, in this optical fiber type polarization compensation apparatus, the two optical fibers 15 and 16 are mutually connected at the end surfaces perpendicular to the main axis, and also the two fibers are connected so that the birefringent axis of each optical fiber which is in the same plane of each end surface makes an angle of 45 degrees each other. Each of optical fibers 15 and 16 is wound around cylinders 2 and 3 of piezoelectric element respectively. Voltage is applied to a pre-stage piezoelectric element cylinder 2 by an electric control scheme 13 so that each electromotive force from two photo detectors 11 and 12 is equal to the other. On the other hand, voltage is applied to a post-stage piezoelectric element cylinder 3 by an electric control scheme 14 so that the outputted light from the λ/4 wave plate 6 is circular polarized light.

The invention described in the above patent publication aims to convert the outputted light from a single mode optical fiber 1 to a linear polarized light which is stable and less loss since, when a linear polarized light enters a single mode optical fiber 1, the outputted light from the fiber does not become a linear polarized light in many cases, and the polarization state is changed by environmental temperature and external stress etc. moment by moment. The converted linear polarized light is inputted to a wave guide type optical element. This is apparent from the description of the introductory portion of the above patent publication "a polarization compensation apparatus which can convert an incident light of arbitrary polarization to an outputted linear polarized light of desired direction". Therefore, in the above patent publication, although there is no description about the technical idea of the present invention that a polarized light outputted from a single made optical fiber 1 is converted to a desired polarized light having polarization state (linear polarization, elliptic polarization or circular polarization) of arbitrary direction in order to measure polarization characteristics of the optical parts, the patent publication is introduced here as a prior art because a similar structure to the stress application part of the present invention is disclosed therein. Namely, a technical idea is disclosed in the patent publication that when voltage is applied to a piezoelectric element cylinder wound by an optical fiber to expand/contract the cylinder in the radius direction, pressure and expansion forces are applied to the optical fiber and at the same time the phase difference of the polarized light propagating through the optical fiber can be changed. However, in the invention of the above patent publication, in order to achieve the aforementioned object, a control optic system comprising two piezoelectric element cylinders 2 and 3, a lens arrangement for converting the output light from the polarized wave maintaining optical fiber 16 wound around the post-stage piezoelectric element cylinder 3 to the parallel light, two half mirrors 4 and 5, λ/4 wave plate 6 and a polarized light beam splitter, and four optical detectors 9–12 and two electric control systems 13 and 14 must be used. Thus, the system arrangement is very complex and expensive. In addition, in the arrangement described in the patent publication, it is difficult to convert a polarized light outputted from a single mode optical fiber 1 to a desired polarized light (linear polarization, elliptic polarization or circular polarization) of various polarization states.

Next, a conventional example for a polarization degree measuring apparatus used for measuring polarization characteristics of an optical coupler, an optical filter, a photo diode and other optical parts will be described referring to FIG. 3.

In FIG. 3, a reference numeral 100 shows a polarization state changing apparatus. As mentioned above, the polarization state changing apparatus 100 comprises a λ/2 wave plate and a λ/4 wave plate, and changes the polarization state of an incident light for output. The output of the polarization state changing apparatus 100 is inputted to a photo analyzer 101. The polarized light power transmitted through the photo analyzer 101 out of the polarized light inputted to the photo analyzer 101 is converted to an electric signal by a photo detector for observation.

In this case, the polarized light power transmitted through the photo analyzer 101 can be expressed as (the polarized light power transmitted through the photo analyzer 101)= (polarized light component power in the photo analyzer's direction)+(random component power). When the powers of both components exist, the above formula means the maximum value ($P_{max}$) Of the polarized light power transmitted through the photo analyzer 101. Also, when the polarized light component power in the photo analyzer's direction does not exist and only the random component power exists, the formula means the minimum value ($P_{min}$) of the polarized light power transmitted through the photo analyzer 101.

From the above, Degree of Polarization can be defined as below.

Degree of Polarization = (polarized light component power in the photo analyzer's direction)/

(power transmitted through the photo analyzer 101) =

$(P_{max} - P_{min})/P_{max}.$

Degree of Polarization can be obtained by substituting ($P_{max}$) and ($P_{min}$) which are measured results of the photo detector 102 for $P_{max}$ and $P_{min}$ in the above formula of polarization degree.

However, since the polarization degree measuring apparatus in the conventional example utilizes the polarization state changing apparatus 100 having above shortcomings, it is naturally difficult to obtain an accurate measured result and also to obtain a measured result quickly. Furthermore, since it is necessary to create a linear polarization, an elliptic polarization and a circular polarization and to rotate their polarization directions to any direction of 360 degrees, the use of the conventional polarization state changing apparatus 100 of above configuration is not necessarily easy.

SUMMARY OF THE INVENTION

The present invention provides a polarization state changing apparatus which eliminates the aforementioned problems of the prior art and a polarization degree measuring apparatus using the polarization state changing apparatus.

The above object in a first aspect of the present invention is achieved by a polarization state changing apparatus comprising two optical fibers mutually connected at the polarization plane changing part and stress application parts for applying stress to the two optical fibers respectively, wherein the two optical fibers are connected at the polarization plane changing part such that the optical axes X and Y of these optical fibers are mutually rotated at an angle of 45 degrees in terms of the fiber axis of the optical fibers.

In a specific example of the polarization state changing apparatus, two stress application parts are constructed by winding two polarization plane maintaining optical fibers in predetermined length around two piezoelectric element cylinders respectively. These two polarization plane maintaining optical fibers are connected such that the optical axes X and Y of one optical fiber are rotated at an angle of 45 degrees to the optical axes X and Y of the other fiber respectively in terms of the fiber axis to form the polarization plane changing part. Also, power supplies for driving each piezoelectric element cylinder respectively are provided, and the oscillating frequency and the generated voltage of each power supply are variable.

In another specific example, two single mode optical fibers of predetermined length are wound around a piezoelectric cylinder in series connection to form a stress application part. The connection portion of these first and second single mode optical fibers is wound in a small coil part to form the polarization plane changing part. Also, a power supply for driving the piezoelectric element cylinder is provided, and the oscillating frequency and the supply voltage of the power supply are variable.

In a second aspect of the present invention, the above object is achieved by a polarization changing apparatus comprising three polarization plane maintaining optical fibers connected in series at two polarization plane changing parts and stress application parts for applying stress to each of those three optical fibers, wherein the three polarization plane maintaining optical fibers are connected at the two polarization changing parts such that the optical axes X and Y of adjacent optical fibers are mutually rotated at an angle of 45 degrees in terms of the fiber axis of the optical fibers.

In a specific example of this polarization changing apparatus, the predetermined length of a first polarization plane maintaining optical fiber is wound around a first piezoelectric cylinder to form a first stress application part, the predetermined length of a second polarization plane maintaining optical fiber is wound around a second piezoelectric cylinder to form a second stress application part and the predetermined length of a third polarization plane maintaining optical fiber is wound around a third piezoelectric cylinder to form a third stress application part. Also, power supplies for driving these first, second and third piezoelectric cylinders respectively are provided and the oscillating frequency and the generated voltage of each power supply are variable.

In another specific example, the predetermined length of a first polarization plane maintaining optical fiber is wound around a first piezoelectric element cylinder to form a first stress application part and the predetermined length of a second polarization plane maintaining optical fiber and the predetermined length of a third polarization surface maintaining optical fiber are wound around a second piezoelectric element cylinder in series connection to form a second stress application part. Also, power supplies for driving these first and second piezoelectric element cylinders respectively are provided and the oscillating frequency and the generated voltage of each power supply are variable.

In a further different specific example, the predetermined length portion of a first polarization plane maintaining optical fiber and the predetermined length portion of a second polarization plane maintaining optical fiber are wound around a first piezoelectric element cylinder in series connection to form a first stress application part and the predetermined length potion of a third polarization plane maintaining optical fiber is wound around a second piezoelectric element cylinder to form a second stress application part. Also, power supplies for driving these first and second piezoelectric element cylinders respectively are provided and the oscillating frequency and the generated voltage of each power supply are variable.

Furthermore, in a third aspect of the present invention, the aforementioned object of the present invention is achieved by a polarization degree measuring apparatus comprising a polarization state changing apparatus according to the present invention, a photo analyzer to which a polarized light output of which polarization state is changed by this polarization state changing apparatus is inputted, a photo detector for detecting the polarized light power that is transmitted through the photo analyzer, a data memory for storing the polarized light power detected by the photo detector and a computing unit for computing degree of polarization through a computation process from the maximum value and the minimum value of the polarized light power stored in the data memory.

BRIEF DESCRIPTION OF THE DRAWINGS

FIGS. 9(a)–(d) are sets of line diagrams showing polarized lights obtained by the polarization state changing apparatus according to the present invention.

DETAIL DESCRIPTION OF THE PREFERRED EMBODIMENT

Figure 1:
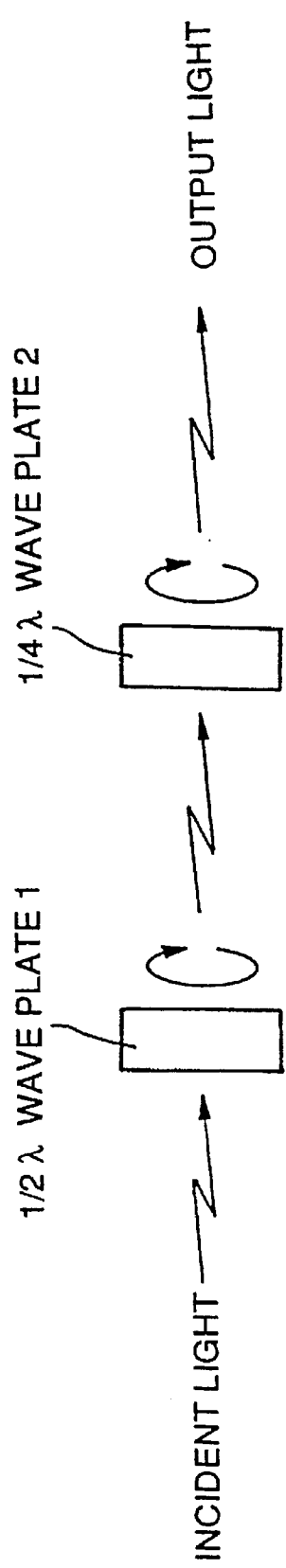
FIG. 1 is a schematic block diagram for explaining an example of a prior art polarization state changing apparatus.
Figure 2:
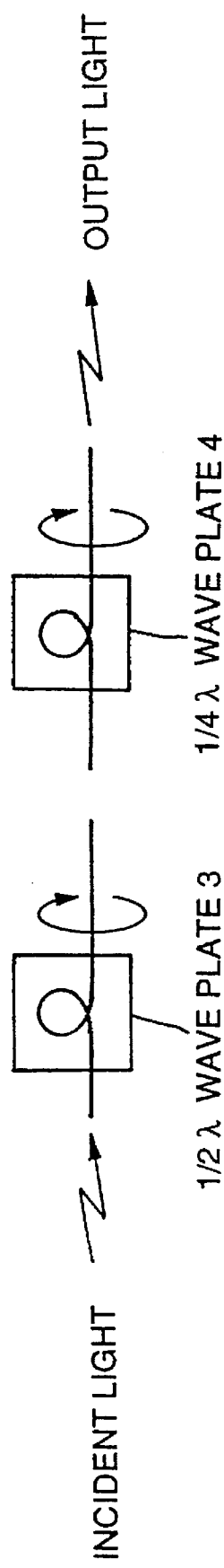
FIG. 2 is a schematic block diagram for explaining another example of a prior art polarization state changing apparatus.
Figure 3:
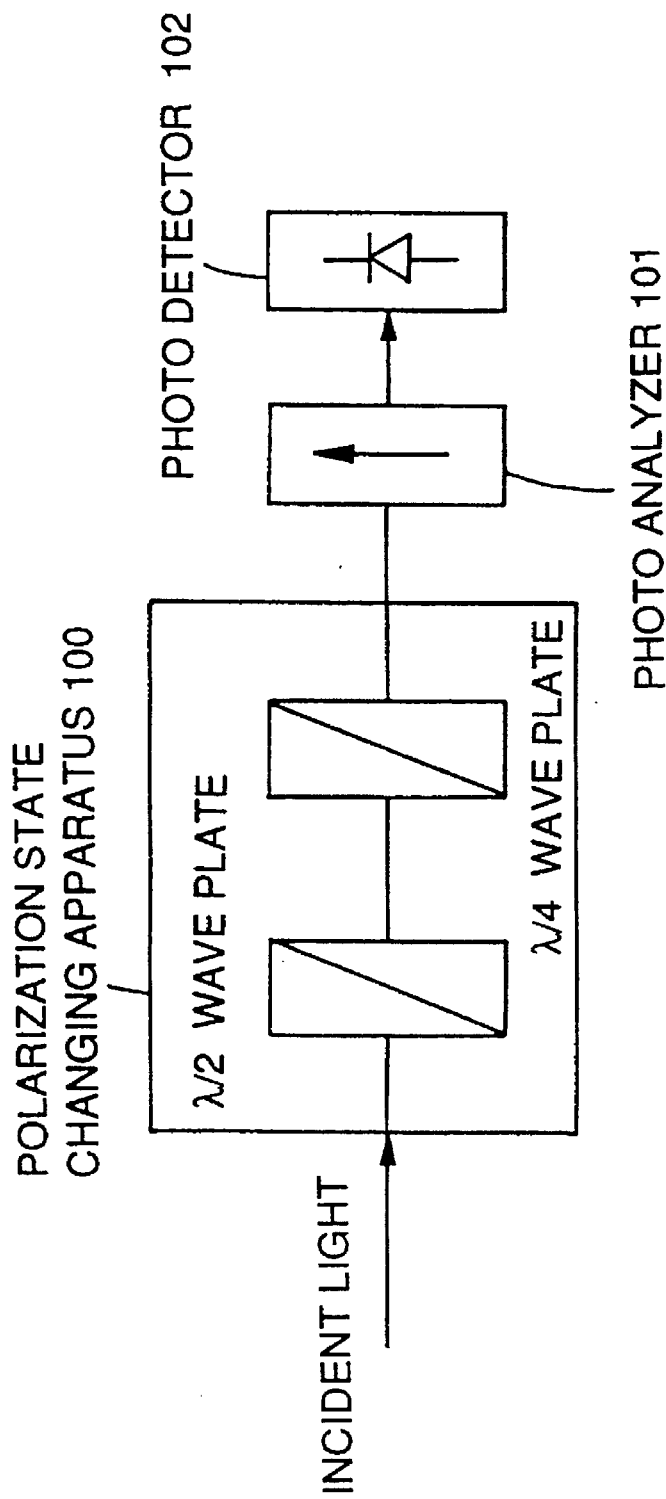
FIG. 3 is a schematic block diagram for explaining an example of a prior art polarization degree measuring apparatus.

First, the principle of the first embodiment of the polarization state changing apparatus according to the present invention will be explained referring to FIG. 4.

Reference numerals 10 and 20 show mutually identical first and second polarization plane maintaining optical fibers (an optical fiber which transmits a polarized light maintaining the polarization plane). These polarization plane maintaining optical fibers 10 and 20 are mutually connected in series at a polarization plane changing part 30. Regarding the degree of displacement between the polarization plane of one optical fiber and the polarization plane of the other optical fiber at the polarization plane changing part 30, when mutually orthogonal optical axes of each of the polarization plane maintaining optical fibers 10 and 20 are an optical axis X and an optical axis Y respectively, a first polarization plane maintaining optical fiber 10 and a second polarization plane maintaining optical fiber 20 are mutually connected at the polarization plane changing part 30 such that the optical axes X and Y of the two fibers are mutually rotated at an angle of 45 degrees in terms of the fiber axis.

In this case, the electric field E of the incident light to the first polarization plane maintaining optical fiber 10 can be expressed as below.

$$E = a_0 \cos(\omega t)$$

If this incident light enters the first polarization plane maintaining optical fiber 10 at an incident angle θ to the optical axis X of the optical fiber 10, the light after transmission along the optical angle X and the optical axis Y of the first polarization plane maintaining optical fiber 10 is expressed as below.

In the direction of the optical axis X:

$$E_x = a_x \cos(\omega t - \delta_1)$$

In the direction of the optical axis Y:

$$E_y = a_y \cos(\omega t - \delta_2)$$

where $a_0$: amplitude of the incident light, $a_x = a_0 \cos \theta$: amplitude in the direction of the optical axis X, $a_y = a_0 \sin \theta$: amplitude in the direction of the optical axis Y, $E_x$: electric field in the direction of the optical axis X at the output end surface of the polarization plane maintaining optical fiber 10, $E_y$: electric field in the direction of the optical axis Y at the output end surface of the polarization plane maintaining optical fiber 10, $\delta_1$: phase delay in the direction of the optical axis X, $\delta_2$: phase delay in the direction of the optical axis Y.

If ωt is eliminated from the above two formulas and δ1−δ2=δ is put into the formulas, the formula below is obtained.

$$\frac{E_x^2}{a_X} + \frac{E_Y^2}{a_Y} - 2 \cdot \frac{E_X}{a_X} \cdot \frac{E_Y}{a_Y} \cos \delta = \sin \delta^2$$

This formula expresses an ellipse.

When the incident angle is θ=45 degrees, the amplitude $a_x = a_0 \cos \theta$ in the optical axis X direction is equal to the amplitude $a_y = a_0 \sin \theta$. When a locus is depicted based on this condition using a parameter of phase difference δ, one of the locus types shown in FIGS. 5(a)–(h) can certainly be depicted. As described above, the locus of elliptic formula i. e., polarization state can be changed using phase difference δ as a parameter. A method for changing phase difference δ will be described below in detail referring to FIG. 6.

Figure 6:
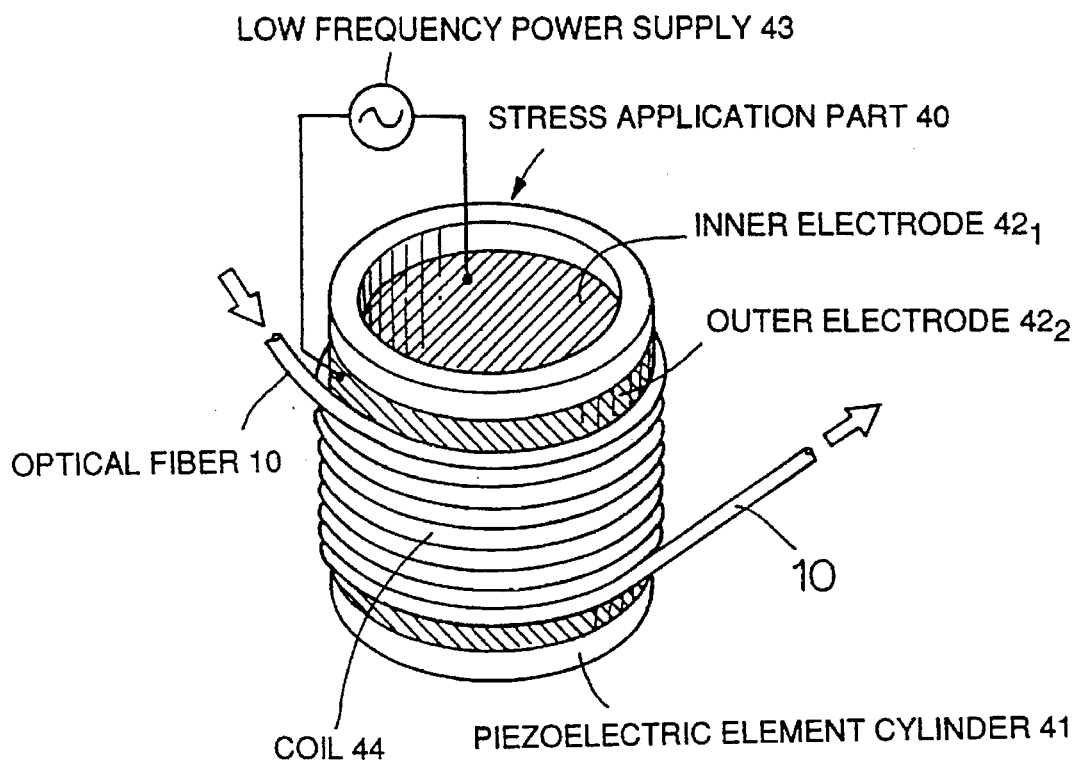
FIG. 6 is a schematic block diagram showing a first specific example of a stress application part used for the first embodiment of the polarization state changing apparatus according to the present invention.

FIG. 6 shows a specific example of a stress application part used for the polarization state changing apparatus according to the present invention. The stress application part 40 includes a cylinder 41 consisting of a piezoelectric element. The cylinder 41 expands and contracts in the radius direction by applying voltage thereto.

Regarding the piezoelectric element cylinder 41, a cylinder shaped inner electrode 42₁ is formed on the inner surface of the piezoelectric element cylinder 41 and also a cylinder shaped outer electrode 42₂ opposing to the inner electrode 42₁ is formed on the outer surface of the cylinder 41. A low frequency power supply 43 is connected between the inner electrode 42₁ and the outer electrode 42₂ to supply predetermined voltage of a predetermined frequency to those electrodes. The oscillating frequency of the low frequency power supply 43 can be variable in the range of, for example, 0.2 Hz–10 Hz and the supply voltage can be variable in the range of, for example, 0V–600V. In this example of the stress application part 40 configured as mentioned above, the predetermined length portion of the first polarization plane maintaining optical fiber 10 (most portion of the optical fiber 10 in this example) is wound around the outer electrode 42₂ of the piezoelectric element cylinder 41 to form a coil 44. Stress is applied to the coil 44 by the stress application part 40 to change the phase difference δ of the polarized light propagating through the first polarization plane maintaining optical fiber 10.

Regarding the winding method of the coil 44, it is essentially desirable that the polarization plane maintaining optical fiber is wound so that the direction of one of the mutually orthogonal two optical axes is parallel to the surface of the piezoelectric element cylinder 41 and the other axis is perpendicular to the surface of the cylinder 41 to apply the stress in the direction parallel to the direction of perpendicular axis. However, it is difficult to wind the optical fiber aligning the axis direction since the axis is twisted in the polarization plane maintaining optical fiber. Therefore, actually, the optical fiber is wound in contact with the outer electrode 42₂ so that the stress from the piezoelectric element cylinder 41 is well transferred to the coil 44. As an actual example of the piezoelectric element cylinder 41, the physical dimensions, radius of 72 mm, thickness of 5 mm, height of 65 mm are used. A polarization plane maintaining optical fiber 10 of 10 m to 100 m is wound around the cylinder 41 to form a coil.

A stress application part 40' (shown by an arrow 40' in FIG. 4) for applying stress to the second polarization plane maintaining optical fiber 20 is also constructed in a similar manner to the stress application part 40 for applying stress to the first polarization plane maintaining optical fiber 10. The polarization state changing apparatus shown in FIG. 4 is constructed by connecting the optical fiber 10 and the optical fiber 20 at the polarization changing part 30 such that the optical axes X and Y of these optical fibers are mutually rotated at an angle of 45 degrees in terms of the fiber axis.

When low frequency voltage is applied by the low frequency power supply 43 between the inner electrode 42₁ and the outer electrode 42₂ of the piezoelectric element cylinder 41 of the stress application part 40, a distortion of the piezoelectric element cylinder 41 changing in response to the frequency of the voltage is generated. As the result, the outer diameter of the piezoelectric element cylinder 41 expands and contracts in response to the frequency of the applied voltage. Based on the expansion and contraction of the outer diameter of the piezoelectric element cylinder 41 in response to the frequency of the applied voltage, a distortion in response to the frequency of the voltage is applied to the coil 44 which is the predetermined length portion of the first polarization plane maintaining optical fiber 10 itself wound around the cylinder 41. When the distortion is applied to the coil 44, the refractive index of the coil portion is changed in response to the distortion. The phase difference δ is changed based on the change of the refractive index. Namely, by applying low frequency voltage between the inner electrode 42₁ and the outer electrode 42₂ of the piezoelectric element cylinder 41, the phase difference δ of a polarized light in the first polarization plane maintaining optical fiber 10 can be changed. Incidentally, it is already explained that a polarization state can be changed by changing the phase difference δ. Magnitude of the phase difference δ can easily be adjusted by making the oscillating voltage of the low frequency power supply 43 variable.

Figure 7:
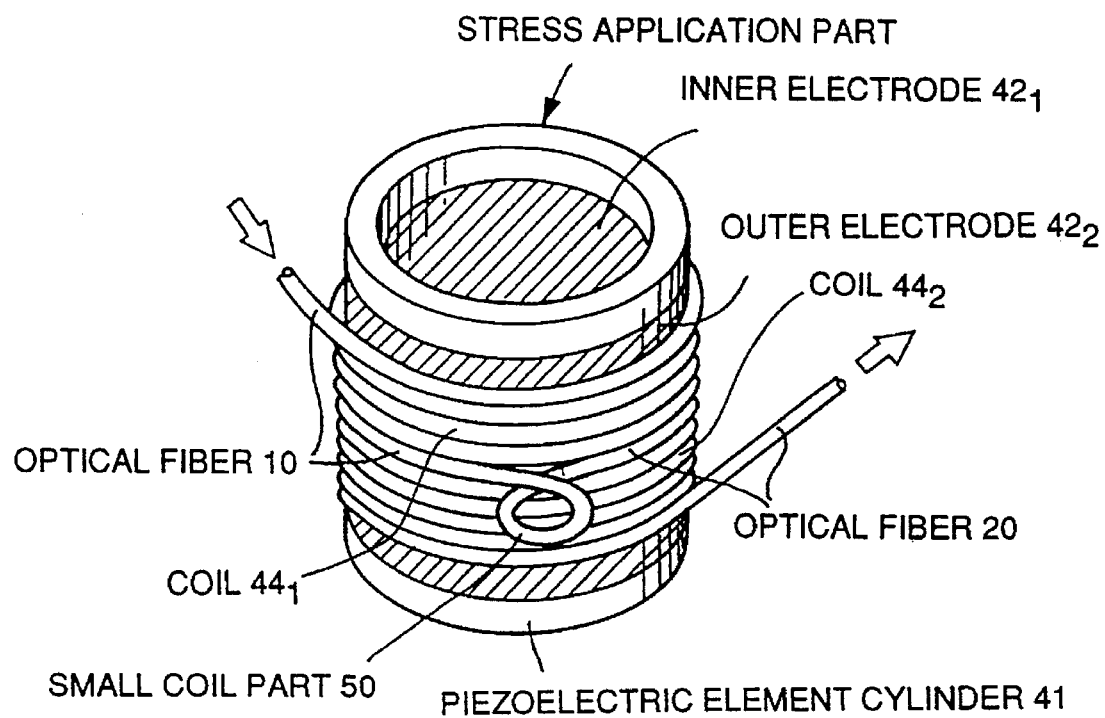
FIG. 7 is a schematic block diagram showing a second specific example of a stress application part used for the first embodiment of the polarization state changing apparatus according to the present invention.
Figure 8A:
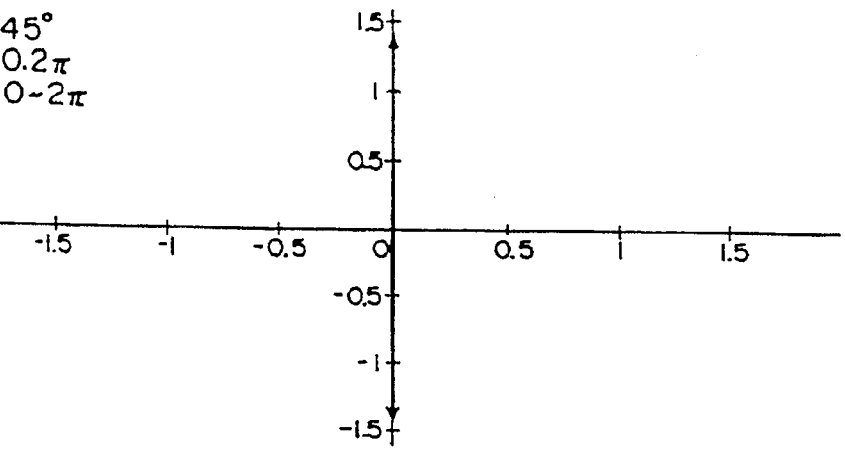
FIGS. 8(a)–(d) are sets of line diagrams showing polarized lights obtained by the polarization state changing apparatus according to the present invention.
Figure 8B:
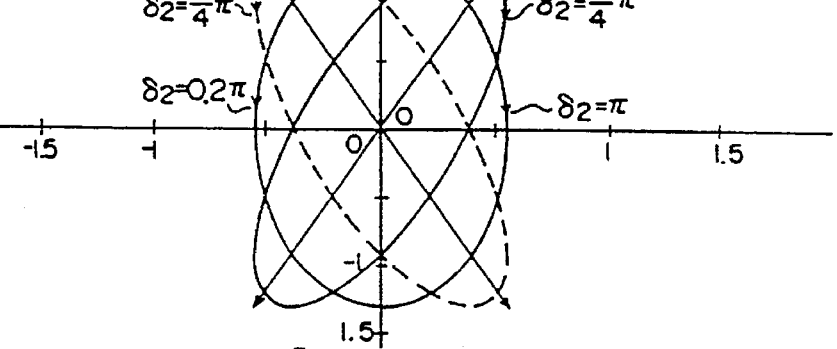
Figure 8C:
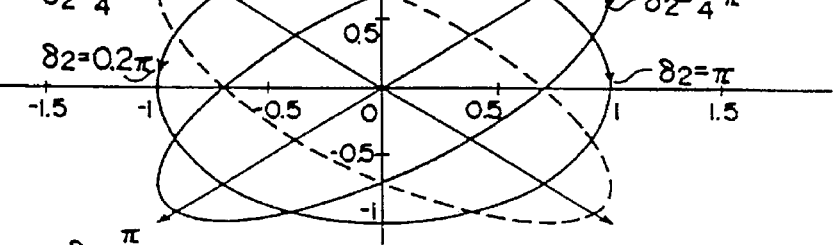
Figure 8D:
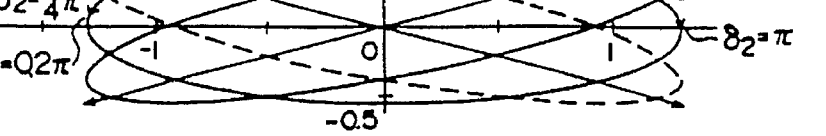
Figure 10A:
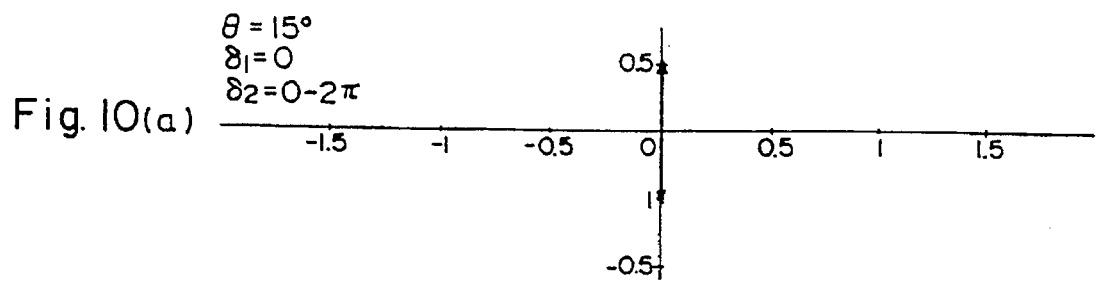
FIGS. 10(a)–(d) are sets of line diagrams showing polarized lights obtained by the polarization state changing apparatus according to the present invention.
Figure 10B:
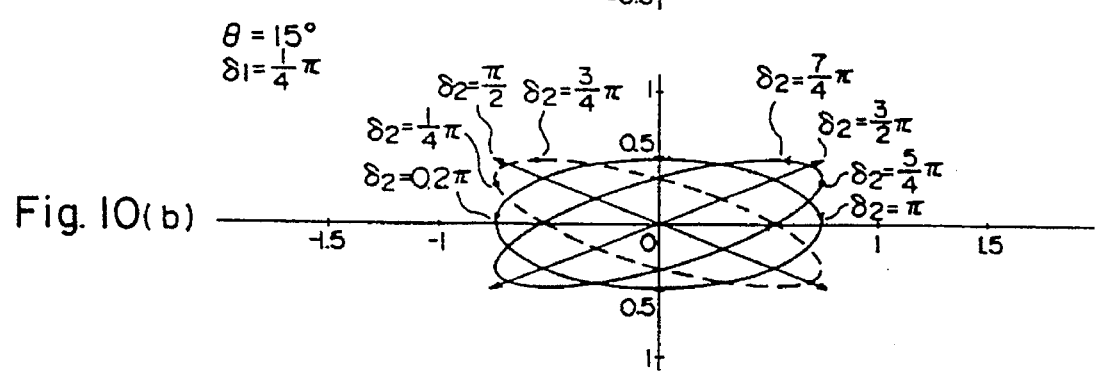
Figure 10C:
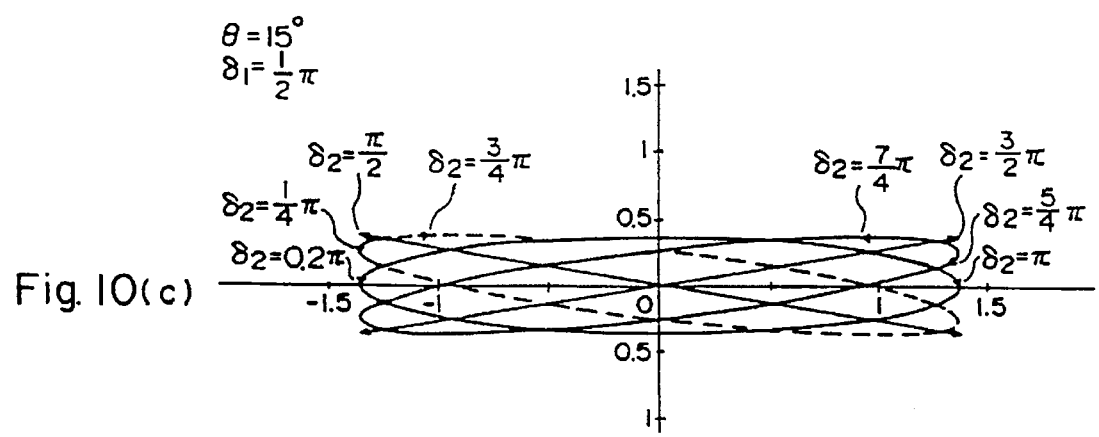
Figure 10D:
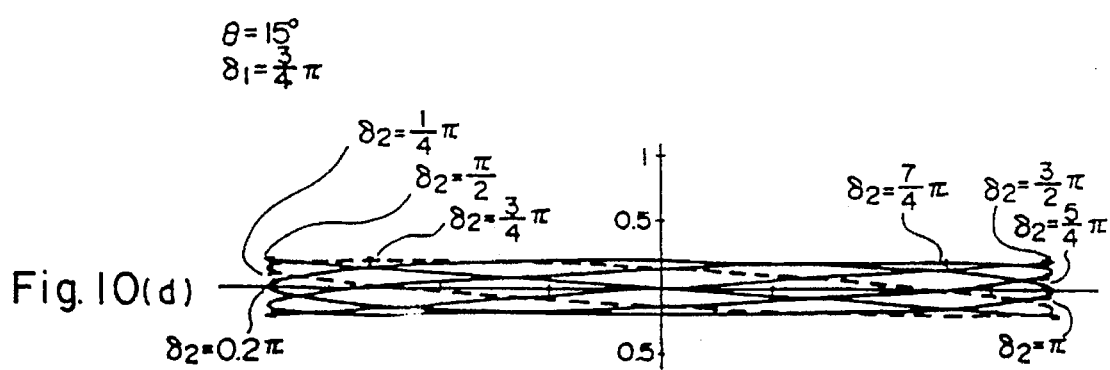
Figure 11A:
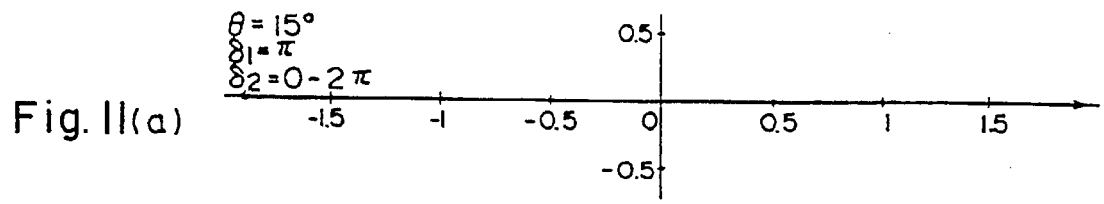
FIGS. 11(a)–(d) are sets of line diagrams showing polarized lights obtained by the polarization state changing apparatus according to the present invention.
Figure 11B:
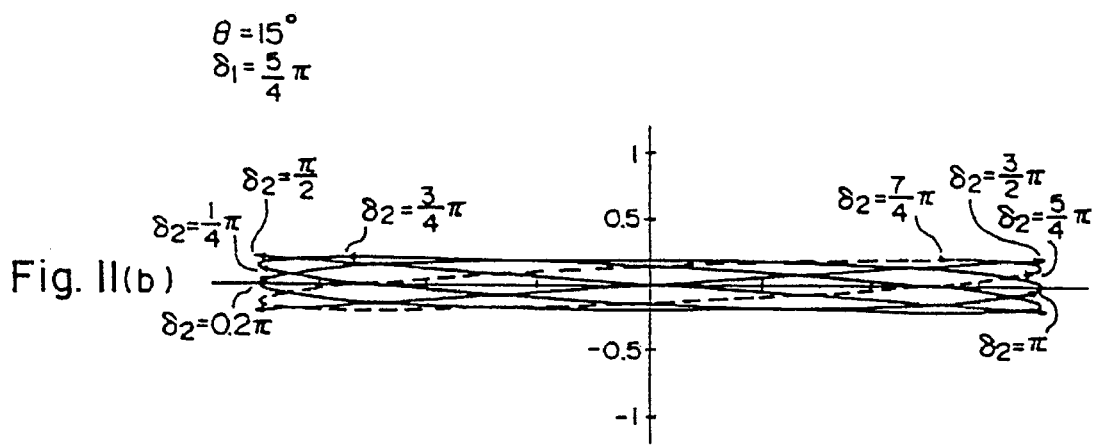
Figure 11C:
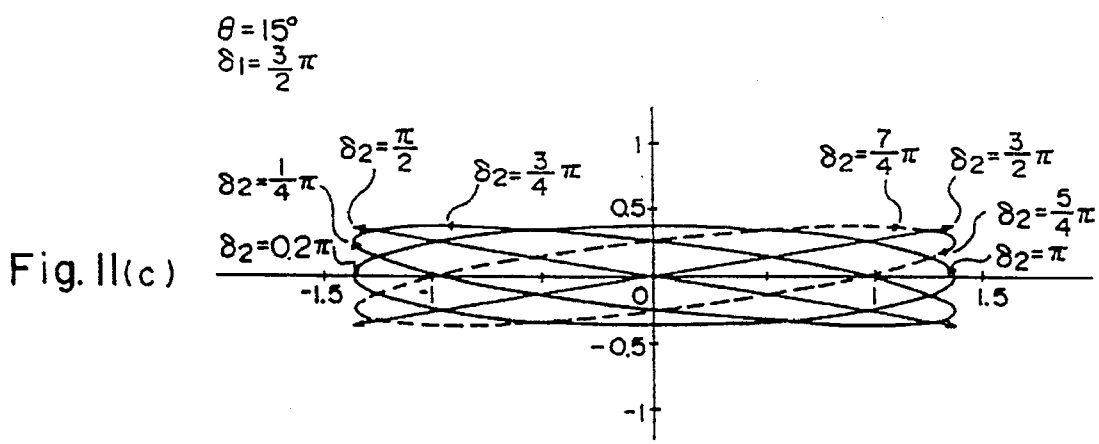
Figure 11D:
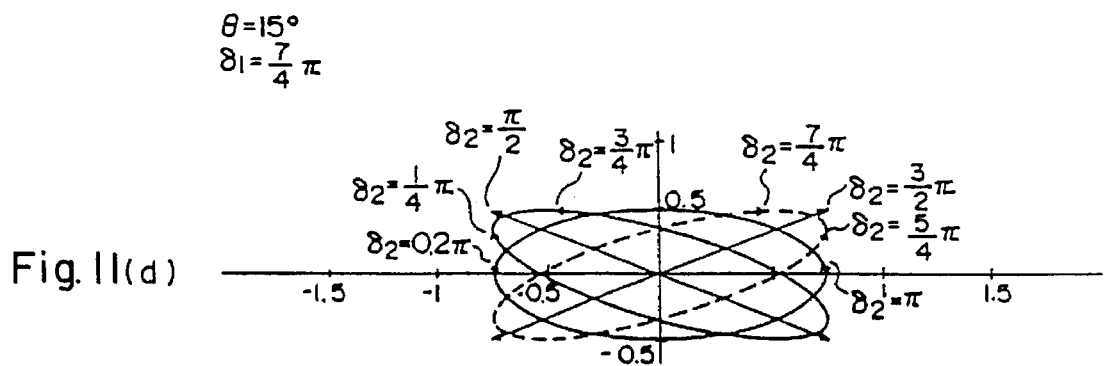

FIG. 7 shows another specific example of the stress application part used in the polarization state changing apparatus according to the present invention. In the specific example shown in FIG. 7, two stress application parts are constructed commonly using a single piezoelectric element cylinder 41. This is different from the arrangement shown in FIG. 6. A single mode optical fiber is used as the optical fibers 10 and 20. The single mode optical fiber (10 and 20) is wound around the outer electrode $42_2$ of the piezoelectric element cylinder 41. A small coil part 50 is formed on the middle of the winding. Namely, coils $44_1$ and $44_2$ of the single mode optical fiber are formed on the outer electrode of the same piezoelectric element cylinder so that the boundary between those coils is the small coil part 50.

Figure 4:
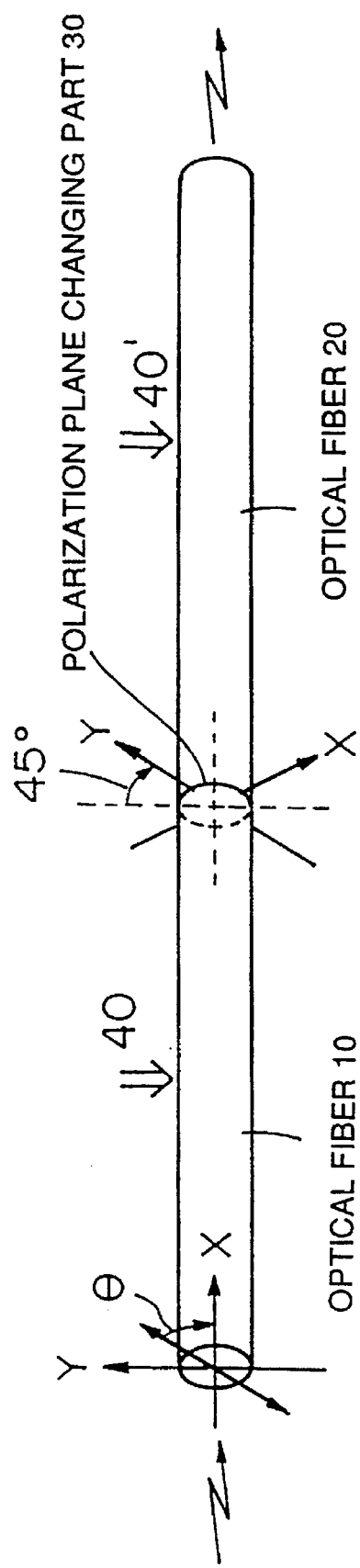
FIG. 4 is a schematic block diagram for explaining the principle of a first embodiment of a polarization state changing apparatus according to the present invention.
Figure 5A:
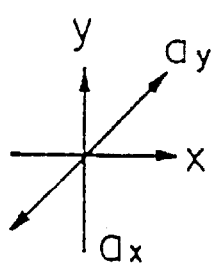
FIGS. 5(a)–(h) are sets of line diagrams showing polarized lights obtained by the first embodiment of the polarization state changing apparatus according to the present invention.
Figure 5B:
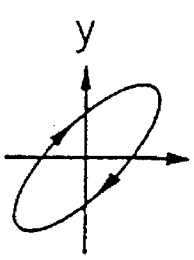
Figure 5C:
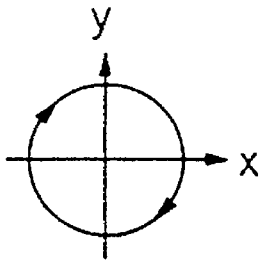
Figure 5D:
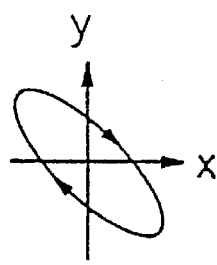
Figure 5E:
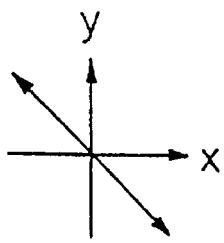
Figure 5F:
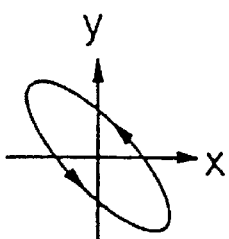
Figure 5G:
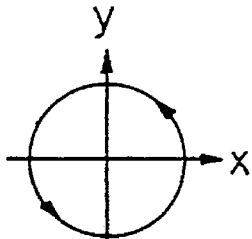
Figure 5H:
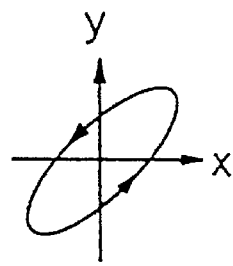

The small coil part 50 corresponds to the polarization plane changing part 30 in FIG. 4. Therefore, the portion from the start of winding through the small coil part 50 of the single mode optical fiber on the piezoelectric element cylinder 41 corresponds to the first optical fiber 10 in FIG. 4 and the portion of the piezoelectric element cylinder 41 around which the coil $44_1$ is wound corresponds to the stress application part 40 of the polarization state changing apparatus shown in FIG. 4. Also, the portion from the small coil part 50 through the end of winding of the single mode optical fiber on the piezoelectric element cylinder 41 corresponds to the second optical fiber 20 in FIG. 4 and the portion of the piezoelectric cylinder 41 around which the coil $44_2$ is wound corresponds to the stress application part 40' of the polarization state changing apparatus shown in FIG. 4. The number of turns and the diameter of the small coil part 50 are determined dependent on the refraction index of the used optical fiber and the polarization plane changing characteristics are determined dependent on the angle between the optical axis of the first fiber 10 before the small coil part 50 and the optical axis of the second fiber 20 after the small coil part 50. In this specific example, the small coil part 50 is adjusted so that the polarization planes are mutually rotated at an angle of 45 degrees.

Like the operation of the stress application part in FIG. 6, in the stress application part in FIG. 7, when low frequency voltage is applied by a low frequency power supply (not shown) between the inner electrode $42_1$ and the outer electrode $42_2$, distortion changing in response to the frequency of the voltage is generated in the piezoelectric element cylinder 41. As the result, the outer diameter of the piezoelectric element cylinder 41 expands and contracts in response to the frequency of the voltage. Based on the expansion and contraction of the outer diameter of the piezoelectric element cylinder 41 in response to the frequency of the applied voltage, distortion in response to the frequency of the voltage is applied to the respective coils $44_1$ and $44_2$ of the single mode optical fibers 10 and 20 wound around the piezoelectric element cylinder 41. When the distortion is applied to the single mode optical fibers 10 and 20, the refraction indices of these fibers are changed. The phase difference δ is changed by the refraction index change. That is, by applying low frequency voltage between the inner electrode $42_1$ and the outer electrode $42_2$, the phase difference δ in the single mode optical fibers 10 and 20 can be changed. The magnitude of the phase difference δ can easily be adjusted by making the generated voltage of the low frequency power supply 43 variable.

In the polarization state changing apparatus arranged above, in order to output a polarized light having polarization state in any direction, it is necessary as a prerequisite that an incident light enters the optical fiber 10 so that the angle of the polarization plane of the incident light to the optical axis X or Y of the optical fiber 10 is 45 degrees. In such an arrangement, all the polarization states shown in FIGS. 8(a)–11(d) can be implemented. Namely, it is possible to output any polarized light having required polarization state by applying stress to both of the optical fibers 10 and 20 which are arranged in both sides of the polarization plane changing part 30 and by properly setting and controlling the phase difference δ.

The reason of the above will be described below. In the case that the aforementioned prerequisite is not provided, referring to FIG. 4, the polarization plane of the incident light having an incident angle θ includes the case where the polarization plane of the incident light matches the optical angle X or Y of the polarization plane maintaining optical fiber 10. Therefore, in this case, the polarization plane is maintained regardless of any stress to the polarization plane maintaining optical fiber 10. Thus, the polarization state cannot be changed. Consequentially, a part of the incident light cannot be changed to the polarized light having required polarization state. In order to avoid this, in the polarization state changing apparatus of the above embodiment, the polarization plane of the incident light must have an angle of 45 degrees to the optical axis X or Y.

The further explanation on this will follow. It is assumed that the incident light is a linear polarized light $E=A_0 \cos(\omega t)$ and the incident angle θ to the optical fiber 10 matches the optical angle X or Y of the optical fiber 10. In this case, the electric field of the propagating light through the optical fiber 10 propagates along only one of the optical axes. Thus, even if stress is applied to the optical fiber 10 to change the birefringence of the optical axes X and Y, the incident linear polarized light is not influenced by the birefrincence change and propagates through the optical fiber 10 maintaining the original linear polarization state. The output polarized light from the optical fiber 10 is expressed as follows.

$$E_x = A_0 \cos(0)\cos(\omega t) = A_0 \cos(\omega t)$$

$$E_y = A_0 \sin(0)\cos(\omega t) = 0$$

$A_0$ : amplitude of the incident light.

Incidentally, since the first optical fiber 10 and the second optical fiber 20 are mutually connected in the state that these optical axes are displaced an angle of 45 degrees, the output polarized light from the first optical fiber 10 enters the second optical fiber 20 with an incident angle θ=45 degrees. That is, the electric field of the incident polarized light to the optical fiber 20 is expressed as follows.

$$E_X = \frac{\sqrt{2}}{2} A_0 \cos(\omega t)$$

$$E_Y = \frac{\sqrt{2}}{2} A_0 \cos(\omega t)$$

$A_0$ : amplitude of the incident light.

In the optical axes X and Y, the phase delay $\tau_{x2}$ and $\tau_{y2}$ are generated respectively by the refringence caused by the applied stress to the second optical fiber 20. The electric field of the output polarized light from the second optical fiber 20 is expressed as follows.

$$E_X = \frac{\sqrt{2}}{2} A_0 \cos(\omega t - \tau_{x2})$$

$$E_Y = \frac{\sqrt{2}}{2} A_0 \cos(\omega t - \tau_{y2})$$

$A_O$ : amplitude of the incident light.

Figure 12:
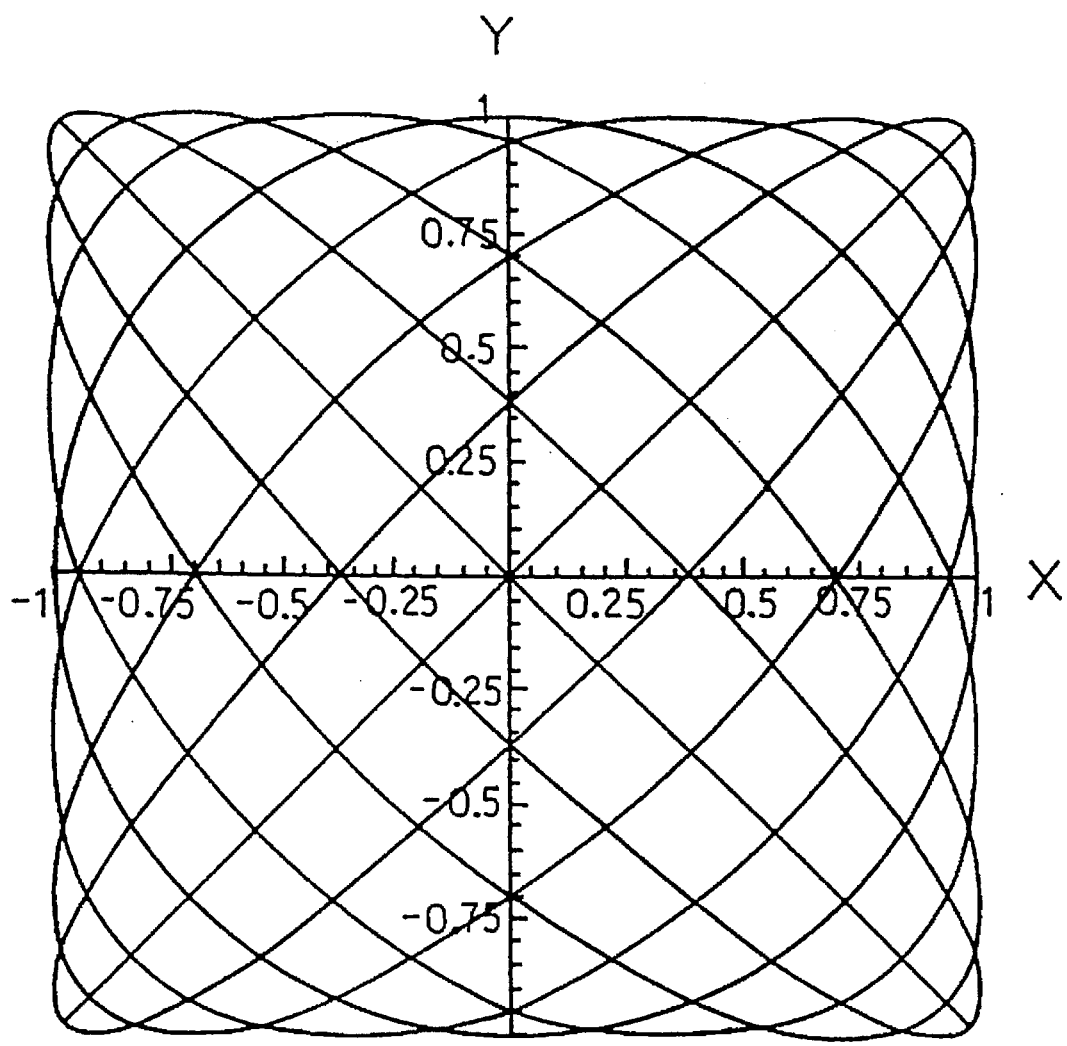
FIG. 12 is a line diagram showing polarized lights obtained by the first embodiment of the polarization state changing apparatus according to the present invention.

Thus, the output light from the second optical fiber 20 becomes as shown in FIG. 12, and a linear polarized light, an elliptic polarized light having an arbitrary ellipticity and a circular polarized light can be generated. However, each of these polarized lights is a polarized wave of constant direction against the optical axes X and Y of the second optical fiber 20. Namely, In FIG. 12, a linear polarized light has an angle of 45 degrees to both optical axes X and Y of the optical fiber 20 and each of the major and minor axes of an elliptic polarization light has an angle of 45 degrees to both optical axes X and Y of the optical fiber 20. Only a polarized light of the constant direction can be taken out from the output end of the optical fiber 20. For example, a linear polarized light having an angle of 22.5 degrees to the optical axes X and Y of the optical fiber 20 cannot be taken out.

As described above, by making the polarization direction of the incident light 45 degrees, for example, any polarized light i.e., a linear polarized light, an elliptic polarized light having an arbitrary ellipticity and a circular polarized light can be generated but the polarization direction of the output polarized light depends on the direction of the optical axis of the optical fiber.

Next, the second embodiment of the polarization state changing apparatus according to the present invention by which the problem of the first embodiment is eliminated will be described.

Figure 13:
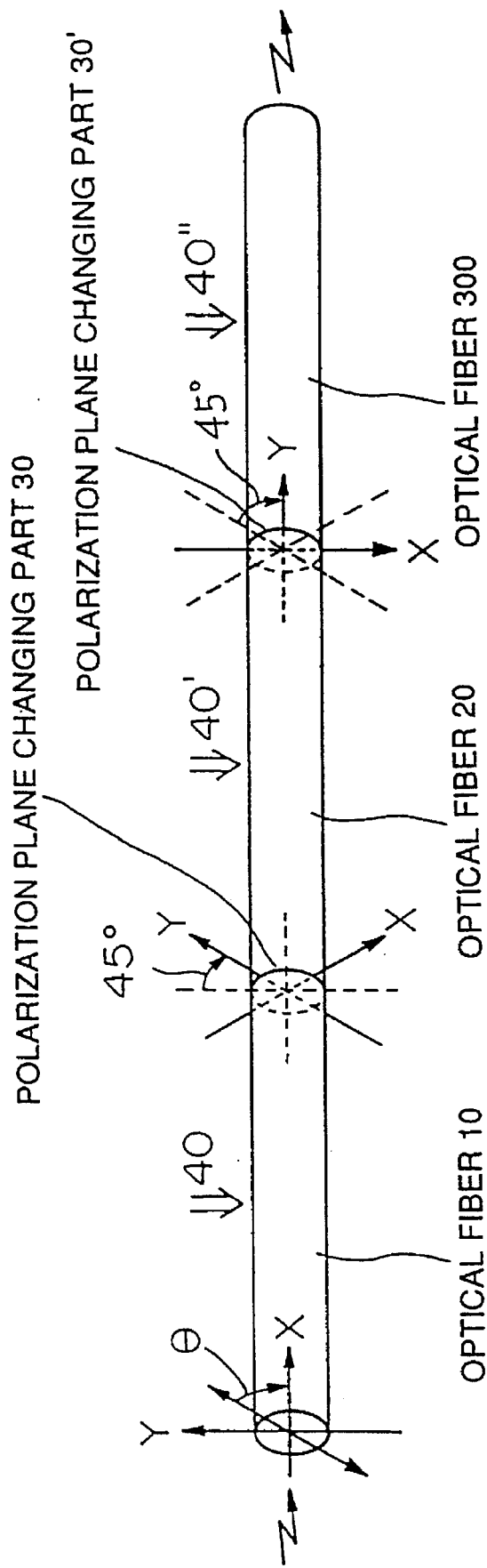
FIG. 13 is a schematic block diagram for explaining the principle of a second embodiment of the polarization state changing apparatus according to the present invention.

First, the principle will be explained referring to FIG. 13. Reference numerals 10, 20 and 300 are a first, a second and a third polarization plane maintaining optical fibers of the same type respectively and those fibers are serially connected.

When mutually orthogonal optical axes of each polarization plane maintaining optical fibers are X and Y, the adjacent polarization plane maintaining optical fibers are serially connected so that the orthogonal optical axes X and Y of the two fibers are mutually displaced (rotated) at an angle of 45 degrees respectively in terms of the fiber axis. That is, at a first polarization plane changing part 30, the first and the second polarization maintaining optical fibers 10 and 20 are serially connected so that the optical axes X and Y of the second polarization maintaining optical fiber 20 are rotated at an angle of 45 degrees to the optical axes X and Y of the first polarization maintaining optical fiber 10 respectively in terms of the fiber axis, and at a second polarization plane changing part 30', the second and the third polarization maintaining optical fibers 20 and 300 are serially connected so that the optical axes X and Y of the third polarization maintaining optical fiber 300 are rotated at an angle of 45 degrees to the optical axes X and Y of the second polarization maintaining optical fiber 20 respectively in terms of the fiber axis.

The reference numeral 40 shows a first stress application part for applying stress to the first polarization plane maintaining optical fiber 10, 40' shows a second stress application part for applying stress to the second polarization plane maintaining optical fiber 20 and 40" shows a third stress application part for applying stress to the third polarization plane maintaining optical fiber 300. The length of the first polarization plane maintaining optical fiber is set so that the phase difference of more than one wavelength is generated between the propagating light oscillating in the direction of the optical axis X and the propagating light oscillating in the direction of the optical axis Y by applying stress by the stress application part 40. Similarly, the length of the second polarization plane maintaining optical fiber 20 and the length of the third polarization plane maintaining optical fiber 300 are also set so that the phase difference of more than one wavelength is generated respectively between the propagating light oscillating in the direction of the optical axis X and the propagating light oscillating in the direction of the optical axis Y by applying stress.

Figure 14:
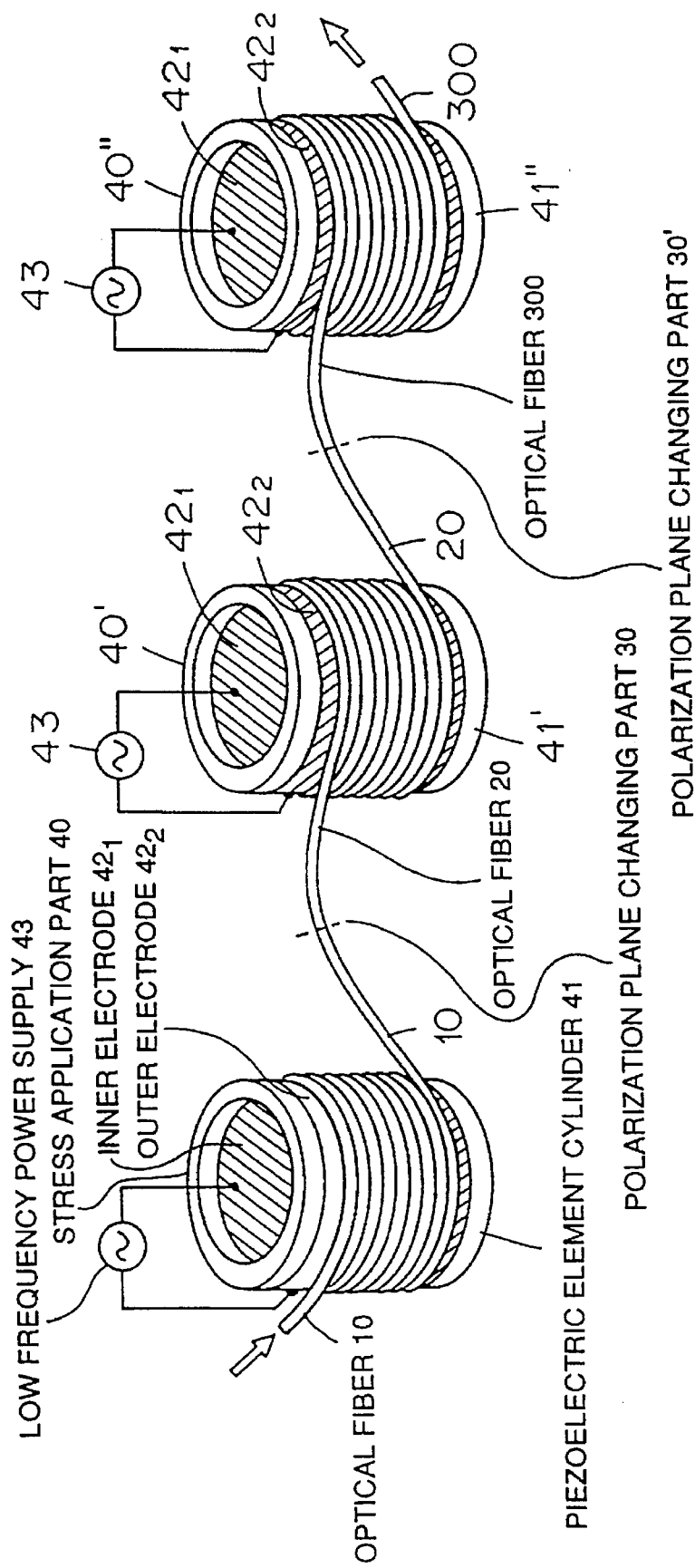
FIG. 14 is a schematic block diagram showing a first specific example of a second embodiment of the polarization state changing apparatus according to the present invention.

Next, a first specific example of the polarization state changing apparatus of aforementioned arrangement will be explained referring to FIG. 14. In the polarization state changing apparatus of FIG. 14, a stress application part of the same arrangement as the stress application part in the first embodiment shown in FIG. 6 is used as means for influencing the optical characteristics of an optical fiber to change the phase difference. In the specific example shown in FIG. 14, the three polarization plane maintaining optical fibers of the first fiber 10, the second fiber 20 and the third fiber 300 which are serially connected at the two polarization changing parts 30 and 30' are mutually connected so that the optical axes X and Y of the adjacent optical fibers are mutually rotated at angle of 45 degrees in terms of the fiber axis. Also, three stress application parts 40, 40' and 40" for applying stress to the three polarization plane maintaining optical fibers 10, 20 and 300 respectively are provided. A predetermined length portion of the first polarization plane maintaining optical fiber 10 is wound around a first piezoelectric element cylinder 41, a predetermined length portion of the second polarization plane maintaining optical fiber 20 is wound around a second piezoelectric element cylinder 41' and a predetermined length portion of the third polarization plane maintaining optical fiber 300 is wound around a third piezoelectric element cylinder 41".

Figure 15:
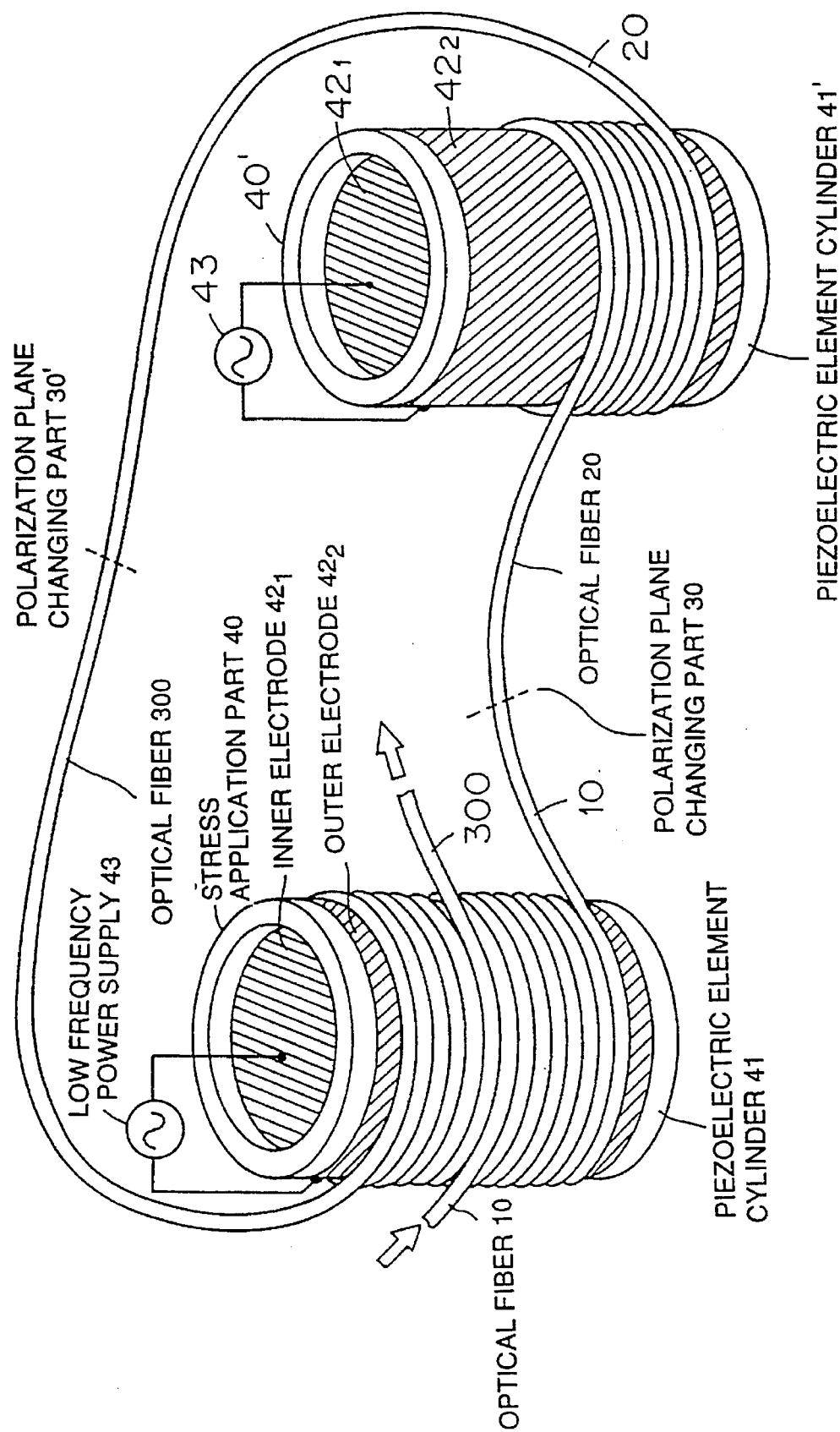
FIG. 15 is a schematic block diagram showing a second specific example of the second embodiment of the polarization state changing apparatus according to the present invention.

FIG. 15 shows a second specific example of the polarization state changing apparatus according to the present invention. In the second specific example shown in FIG. 15, a predetermined length portion of the first polarization plane maintaining optical fiber 10 is wound around the first piezoelectric element cylinder 41, a predetermined length portion of the second polarization plane maintaining optical fiber 20 is wound around the second piezoelectric element cylinder 41' and a predetermined length portion of the third polarization plane maintaining optical fiber 300 is wound around the first piezoelectric element cylinder 41 again. In FIG. 15, the first polarization plane maintaining optical fiber is wound around the lower portion of the first piezoelectric element cylinder 41 and the third polarization plane maintaining optical fiber 300 is wound around upper portion of the first piezoelectric element cylinder 41. However, needless to say, the first polarization plane maintaining optical fiber 10 may be wound around the upper portion of the first piezoelectric element cylinder 41 and the third polarization plane maintaining optical fiber 300 may be wound around the lower portion of the first piezoelectric element cylinder 41.

In each of the specific examples, the incident light (polarized light) entering the first optical fiber 10 is given a phase difference while propagating through the optical axis X and the optical axis Y by the refraction index difference between the two (axis X and axis Y). The propagating light through the optical fiber 10 to which a phase difference has been given then enters the second optical fiber 20 connected to the first optical fiber 10 at the first polarization changing part 30 such that the optical axes X and Y are rotated at an angle of 45 degrees to the optical axes X and Y of the first optical fiber 10 and propagates through the second optical fiber 20. In this optical fiber 20, the incident light is also given a phase difference during the propagation as in the first optical fiber 10. The light which passed through the second optical 20 then enters the third optical fiber 300 connected to the second optical fiber 20 at the second polarization changing part 30' such that the optical axes X and Y are rotated at an angle of 45 degrees to the optical axes X and Y of the second optical fiber 20 and propagates through the third optical fiber 300. In this optical fiber 300, the light is also given a phase difference as in the optical fibers 10 and 20.

The polarization light outputted from the third optical fiber 300 is a composite wave of the lights passed through the optical axes X and Y of the third optical fiber 300. This will be explained below.

The electric field E of the incident light to the first polarization plane maintaining optical fiber 10 can be expressed as follows as mentioned above.

$$E = A_0 \cos(\omega t),$$

where $A_0$ : amplitude of the incident light.

Assuming that the incident light enters the first polarization plane maintaining optical fiber 10 with the incident angle $\theta$ to the optical axis, the electric field is expressed as below.

In the direction of the optical axis X:

$$E_x = A_0 \cos(\theta)\cos(\omega t)$$

In the direction of the optical axis Y:

$$E_y = A_0 \sin(\theta)\cos(\omega t)$$

If the phase difference of the incident light generated by the refringence of the optical axes during the propagation through the first optical fiber 10 is $\tau_1$, the electric field of the light outputted from the first optical fiber 10 is expressed as below.

$$E_x = A_0 \cos(\theta)\cos(\omega t - \tau_1)$$

$$E_y = A_0 \sin(\theta)\cos(\omega t)$$

The electric field of the incident light to the second optical fiber 20 is expressed as below since the first optical fiber 10 and the second optical fiber 20 are mutually connected so that the optical axes of these optical fibers are mutually rotated at an angle of 45 degrees in terms of the fiber axis.

$$E_X = \frac{A_0\cos(\theta)\cos(\omega t - \tau_1)}{\sqrt{2}} + \frac{A_0\sin(\theta)\cos(\omega t)}{\sqrt{2}}$$

$$E_Y = \frac{A_0\cos(\theta)\cos(\omega t - \tau_1)}{\sqrt{2}} - \frac{A_0\sin(\theta)\cos(\omega t)}{\sqrt{2}}$$

If the phase difference of the incident light generated by refringence of the optical axes during the propagation through the second optical fiber 20 is $\tau_2$, the electric field of the light outputted from the second optical fiber 20 is expressed as below.

$$E_X = \frac{A_0\cos(\theta)\cos(\omega t - \tau_1 - \tau_2)}{\sqrt{2}} + \frac{A_0\sin(\theta)\cos(\omega t - \tau_2)}{\sqrt{2}}$$

-continued $$E_Y = \frac{A_0\cos(\theta)\cos(\omega t - \tau_1)}{\sqrt{2}} - \frac{A_0\sin(\theta)\cos(\omega t)}{\sqrt{2}}$$

The electric field of the incident light to the third optical fiber 300 is expressed as below since the second optical fiber 20 and the third optical fiber 300 are mutually connected so that the optical axes of these optical fibers are mutually rotated at an angle of 45 degrees in terms of the fiber axis.

$$E_X = \frac{\frac{A_0\cos(\theta)\cos(\omega t - \tau_1 - \tau_2)}{\sqrt{2}} + \frac{A_0\sin(\theta)\cos(\omega t - \tau_2)}{\sqrt{2}}}{\sqrt{2}} +$$

$$\frac{\frac{A_0\cos(\theta)\cos(\omega t - \tau_1)}{\sqrt{2}} - \frac{A_0\sin(\theta)\cos(\omega t)}{\sqrt{2}}}{\sqrt{2}}$$

$$E_Y = \frac{\frac{A_0\cos(\theta)\cos(\omega t - \tau_1 - \tau_2)}{\sqrt{2}} + \frac{A_0\sin(\theta)\cos(\omega t - \tau_2)}{\sqrt{2}}}{\sqrt{2}} -$$

$$\frac{\frac{A_0\cos(\theta)\cos(\omega t - \tau_1)}{\sqrt{2}} - \frac{A_0\sin(\theta)\cos(\omega t)}{\sqrt{2}}}{\sqrt{2}}$$

If the phase difference of the incident light generated by refringence of the optical axes during the propagation through the third optical fiber 300 is $\tau_3$, the electric field of the light outputted from the third optical fiber 300 is expressed as below.

$$E_X = \frac{\frac{A_0\cos(\theta)\cos(\omega t - \tau_1 - \tau_2 - \tau_3)}{\sqrt{2}} + \frac{A_0\sin(\theta)\cos(\omega t - \tau_2 - \tau_3)}{\sqrt{2}}}{\sqrt{2}} +$$

$$\frac{\frac{A_0\cos(\theta)\cos(\omega t - \tau_1 - \tau_3)}{\sqrt{2}} - \frac{A_0\sin(\theta)\cos(\omega t - \tau_3)}{\sqrt{2}}}{\sqrt{2}}$$

$$E_Y = \frac{\frac{A_0\cos(\theta)\cos(\omega t - \tau_1 - \tau_2)}{\sqrt{2}} + \frac{A_0\sin(\theta)\cos(\omega t - \tau_2)}{\sqrt{2}}}{\sqrt{2}} -$$

$$\frac{\frac{A_0\cos(\theta)\cos(\omega t - \tau_1)}{\sqrt{2}} - \frac{A_0\sin(\theta)\cos(\omega t)}{\sqrt{2}}}{\sqrt{2}}$$

Figure 16:
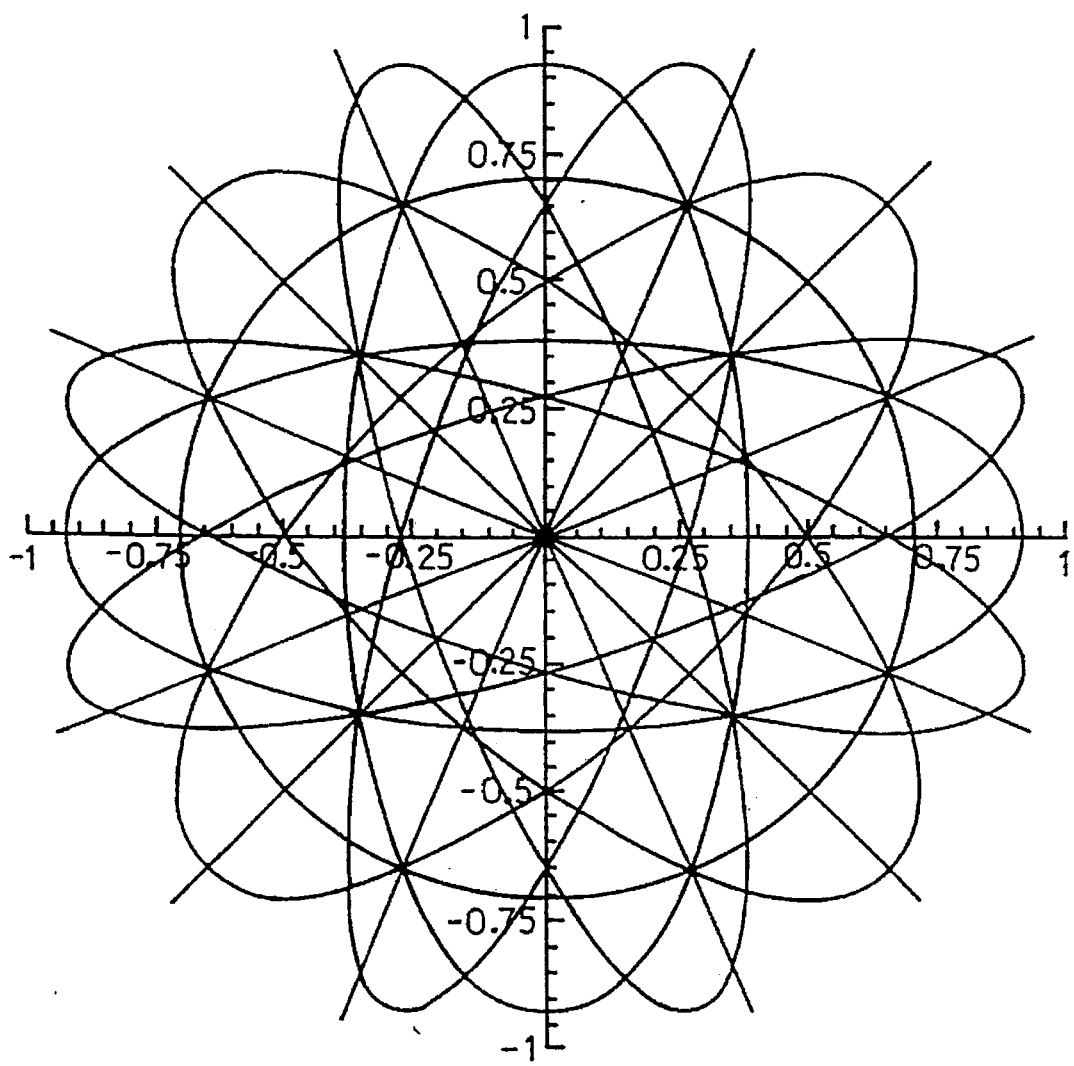
FIG. 16 is a line diagram showing polarized lights obtained by the second embodiment of the polarization state changing apparatus according to the present invention.

Regarding these formulas, the polarization state of the radiated output light from the third optical fiber in the case where $\omega t$ is varied in the range of 0–$2\pi$ is shown in FIG. 16. FIG. 16 shows the case where the incident angle $\theta=0$, and $\omega t$ is varied in the steps of $\pi/4$. As apparent from the figure, according to the second embodiment, it will easily be understood that a linear polarized light for every angle can also be implemented independently of the polarization state of the incident light.

Figure 17:
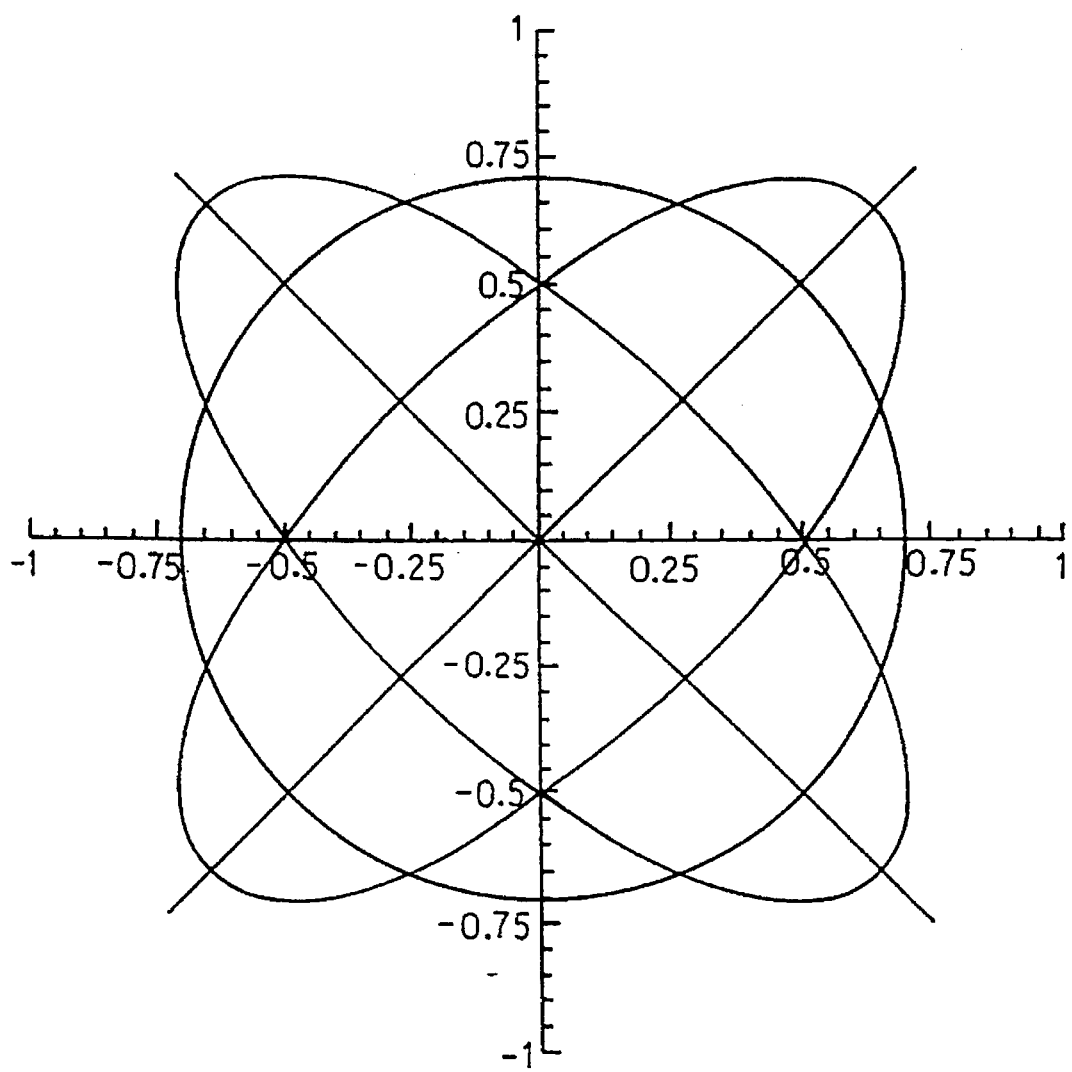
FIG. 17 is a line diagram showing polarized lights obtained by the first embodiment of the polarization state changing apparatus according to the present invention when an incident polarized light matches the optical axis of the optical fiber.

For comparison purposes, the polarization state of the radiated output light in the similar condition to the aforementioned first embodiment of only one polarization plane changing part at which two optical fibers are connected is shown in FIG. 17. FIG. 17 shows similar results shown in FIG. 12. In the case of FIG. 17, a linear polarized light having an angle of 45 degrees to the optical axis of the optical fiber is outputted since an incident linear polarized light having an incident angle θ=0 is entered.

In the above specific example, the stress application part of the first specific example in the first embodiment shown in FIG. 6 is used. However, the second embodiment can also be implemented using the stress application part of the second specific example shown in FIG. 7. In this case, the first optical fiber 10 and the second optical fiber 20 are wound around the first piezoelectric element cylinder and the third optical fiber 300 is wound around the second piezoelectric element cylinder.

In the each specific example of the second embodiment, a polarization plane maintaining optical fiber is used as an optical fiber. However, a usual optical fiber may also be used. A usual optical fiber is less expensive compared with a polarization plane maintaining optical fiber. However, generated birefringence of a usual optical fiber is smaller than that of a polarization plane maintaining optical fiber, and thus, larger pressure needs to be applied and longer fiber length is required.

Figure 18:
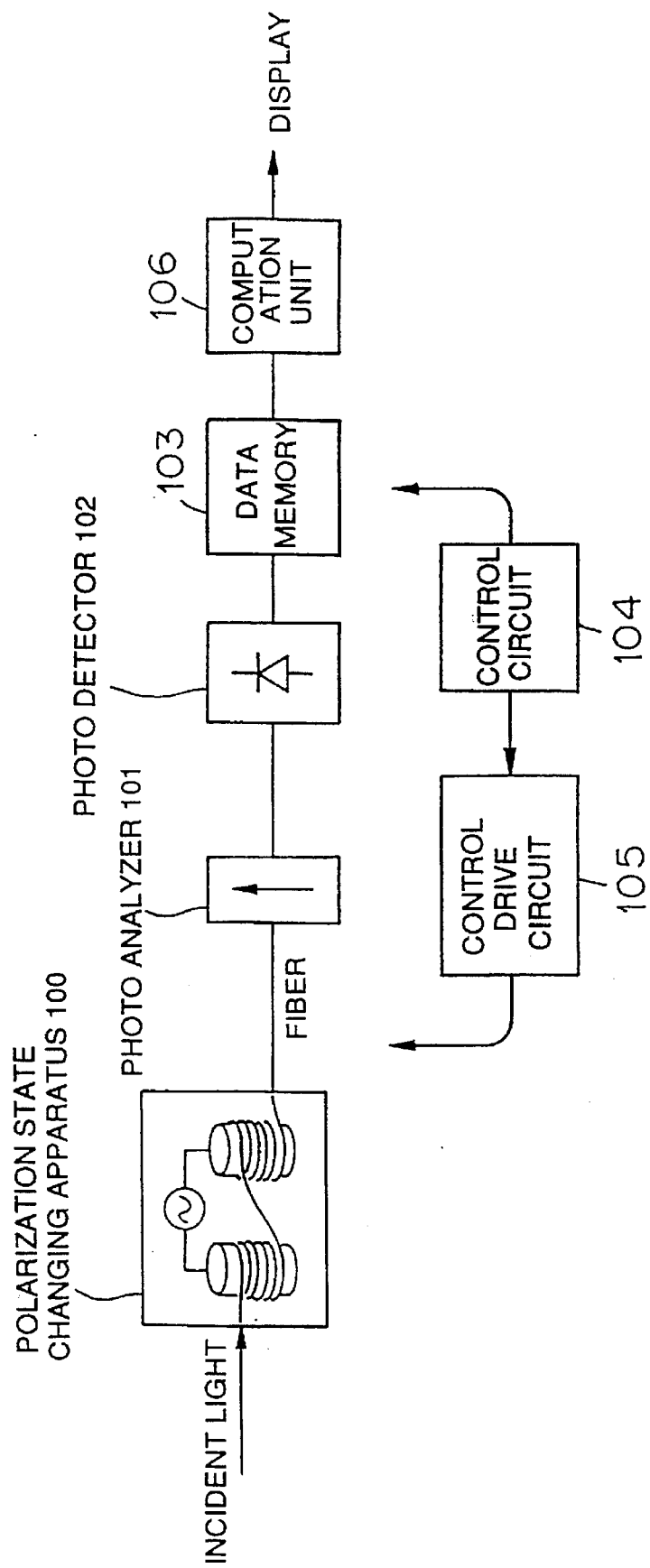
FIG. 18 is a schematic block diagram for explaining an embodiment of the polarization state changing apparatus according to the present invention.

Next, an embodiment of a polarization degree measuring apparatus using the polarization state changing apparatus of the second embodiment according to the present invention will be explained referring to FIG. 18. In FIG. 18, a reference numeral 100 shows a polarization state changing apparatus. The polarization state changing apparatus according to the present invention explained referring to FIG. 14 or FIG. 15 is used as this polarization state changing apparatus 100. The polarized light output of which polarization state is changed by the polarization state changing apparatus 100 is inputted to a photo analyzer 101. The polarized light power out of the polarized light inputted to the photo analyzer, which could transmit through the photo analyzer 101 is detected by a photo detector 102. The polarized light power which transmitted through the photo analyzer 101 and detected by the photo detector 102 is stored in a data memory 103.

Reference numerals 104, 105 and 106 show a control circuit, a control drive circuit and a computation unit respectively.

As mentioned above, the degree of polarization can be measured by the following formula from the maximum and minimum values of the polarized light power transmitted through the photo analyzer 101.

Degree of Polarization=(maximum value−minimum value)/(maximum value)

In other word, the maximum and minimum values of the polarized light power output are detected by the photo detector 102 by controlling the photo analyzer 101, the maximum and the minimum values are stored in the data memory 103, degree of polarization is obtained by the above formula of degree of polarization in the computation unit 106 using the stored maximum and minimum values, and then the computation result is displayed. As mentioned above, in the polarization state changing apparatus of the present invention, since λ/2 wave plate and λ/4 wave plate are not used, rotation means for rotating these wave plates is not necessary. In addition, since an axis displacement between these wave plates does not exist, an optical axis adjustment is not necessary. Furthermore, since a reflection loss of an incident light at each surface of the wave plates does not exist, a polarization degree measuring apparatus which is capable of measuring degree of polarization accurately and quickly can be constructed.

EFFECT OF THE INVENTION

As apparent from the above explanation, in order to change the polarization state of a polarized light entering an optical fiber, the polarization state changing apparatus according to the present invention does not require to use a complex optical system and a complex electric control system but merely requires a control/adjustment of frequency and voltage of a power supply for driving a piezoelectric element cylinder. Therefore, the polarization state can be changed very simply and very quickly. Since rotation means is not necessary and an optical axis adjustment is not necessary, a simple and less expensive apparatus can be constructed and the apparatus can change an incident polarized light to a polarized light having an arbitrary polarization state accurately and quickly and then can output. Moreover, in the second embodiment of the present invention, since a polarized light of arbitrary polarization state can be created even if an incident polarized light enters an optical fiber with an arbitrary incident angle θ to the optical axes X or Y of the optical fiber, no prerequisite condition is necessary on the incident angle of the polarized light. In addition, an accurate and high speed polarization degree measuring apparatus which does not include any rotating member and does not require an optical axis adjustment can easily be constructed using the polarization state changing apparatus of the present invention.

We claim:

1. A polarization state changing apparatus characterized in that comprising:

a first and a second polarization plane maintaining optical fibers;

a polarization plane changing part at which said first and second optical fibers are serially connected such that the optical axes X and Y of these optical fibers are mutually rotated at angle of 45 degrees in terms of the fiber axis; and two stress application parts each of which applies stress to each of the optical fibers respectively and comprises a piezoelectric element cylinder and a power supply for driving said piezoelectric element cylinder;

wherein a predetermined length portion of said first optical fiber is wound around a first piezoelectric element cylinder and a predetermined length potion of said second optical fiber is wound around a second piezoelectric element cylinder, and the oscillating frequency and the generated voltage of said power supply are both variable.

2. A polarization state changing apparatus characterized in that comprising:

a first and a second single mode optical fibers;

a polarization plane changing part at which said first and second optical fibers are serially connected such that the optical axes X and Y of these optical fibers are mutually rotated at angle of 45 degrees in terms of the fiber axis; and a stress application part for commonly applying stress to each of said optical fibers, said stress application part comprising a piezoelectric element cylinder and a power sully for driving said piezoelectric element cylinder;

wherein predetermined length portions of said first and second optical fibers are consecutively wound around said piezoelectric element cylinder, said polarization plane changing part is a small coil part which is formed by winding portions of said optical fibers in a loop at the connection portion of said first and second optical fibers, and the oscillating frequency and the generated voltage of said power supply are both variable.

3. A polarization state changing apparatus characterized in that comprising:

a first, a second and a third optical fibers;

a first polarization plane changing part at which said first and second optical fibers are serially connected such that the optical axes X and Y of these optical fibers are mutually rotated at angle of 45 degrees in terms of the fiber axis;

a second polarization plane changing part at which said second and third optical fibers are serially connected such that the optical axes X and Y of these optical fibers are mutually rotated at angle of 45 degrees in terms of the fiber axis; and at least two stress application parts for applying stress to each of said three optical fibers.

4. The polarization state changing apparatus according to claim 3 wherein the apparatus is characterized in that each of said stress application parts comprises a piezoelectric element cylinder and a power supply for driving said piezoelectric element cylinder.

5. The polarization state changing apparatus according to claim 4 wherein the apparatus is characterized in that the oscillating frequency and the generated voltage of said power supply are both variable.

6. The polarization state changing apparatus according to claim 4 wherein the apparatus is characterized in that three stress application parts each of which comprises a piezoelectric element cylinder and a power supply for driving said piezoelectric element cylinder are provided, said first optical fiber is wound around a piezoelectric element cylinder of a first stress application part, said second optical fiber is wound around a piezoelectric element cylinder of a second stress application part and said third optical fiber is wound around a piezoelectric element cylinder of a third stress application part.

7. The polarization state changing apparatus according to claim 4 wherein the apparatus is characterized in that said first optical fiber is wound around a first piezoelectric element cylinder, said second optical fiber is wound around a second piezoelectric element cylinder and said third optical fiber is wound around said first piezoelectric element cylinder.

8. The polarization state changing apparatus according to claim 4 wherein the apparatus is characterized in that said first and second optical fibers are wound around a first piezoelectric element cylinder and said third optical fiber is wound around a second piezoelectric element cylinder.

9. The polarization state changing apparatus according to claim 3 wherein the apparatus is characterized in that each of said optical fibers is a polarization plane maintaining optical fiber.

10. A polarization degree measuring apparatus characterized in that comprising:

a polarization state changing apparatus comprising a first, a second and a third optical fibers, a first polarization plane changing part at which said first and second optical fibers are serially connected such that the optical axes X and Y of these optical fibers are mutually rotated at angle of 45 degrees in terms of the fiber axis, a second polarization plane changing part at which said second and third optical fibers are serially connected such that the optical axes X and Y of these optical fibers are mutually rotated at angle of 45 degrees in terms of the fiber axis, and at least two stress application parts for applying stress to each of said three optical fibers;

a photo analyzer to which the polarized light output of said polarization state changing apparatus is inputted, the polarization state of the polarized light output has been changed by said polarization state changing apparatus;

a photo detector for detecting polarized light power transmitted through said photo analyzer;

a data memory for storing the polarized light power detected by said photo detector; and a computation unit for detecting the maximum value and the minimum value of the polarized light power output stored in said data memory to compute degree of polarization of the incident polarized light in a computation process using the maximum and minimum values.

11. The polarization degree measuring apparatus according to claim 10 wherein the apparatus is characterized in that each of said stress application parts comprises a piezoelectric element cylinder and a power supply for driving said piezoelectric element cylinder.

12. The polarization degree measuring apparatus according to claim 11 wherein the apparatus is characterized in that the oscillating frequency and the generated voltage of said power supply for driving said piezoelectric element cylinder are both variable.

13. The polarization degree measuring apparatus according to claim 10 wherein the apparatus is characterized in that each of said optical fibers is a polarization plane maintaining optical fiber.

* * * * *